Figure 1:
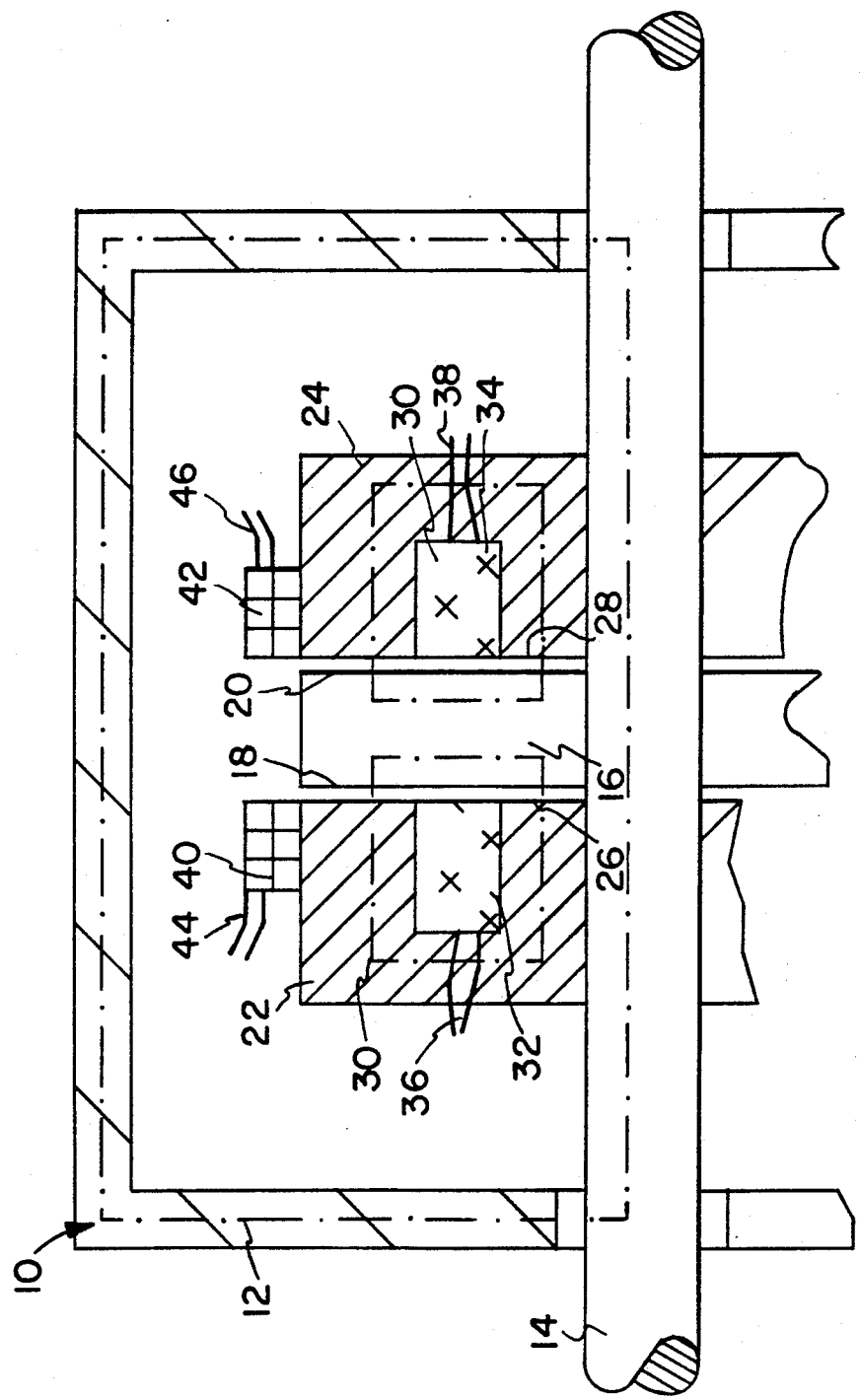

United States Patent [19]

Harris et al.

[11] Patent Number: 5,084,644
[45] Date of Patent: Jan. 28, 1992

[54] CONTROL OF MAGNETIZATION OF A MACHINE WITH AXIAL MAGNETIC BEARINGS

[75] Inventors: Tim Harris; Michal Urednicek, both of Calgary, Canada

[73] Assignee: Nova Corporation of Alberta, Calgary, Canada

[21] Appl. No.: 640,841

[22] Filed: Dec. 20, 1990

[51] Int. Cl.⁵ .............................................. F16C 39/00
[52] U.S. Cl. ................................................... 310/90.5
[58] Field of Search ................. 310/90.5, 12, 13, 179, 310/254, 261, 190, 191, 196

[56] References Cited

U.S. PATENT DOCUMENTS

| | | | |
|---|---|---|---|
| 3,877,761 | 4/1975 | Boden et al. | 310/90.5 |
| 3,937,533 | 2/1976 | Veillette | 310/90.5 |
| 4,037,886 | 7/1977 | Boden et al. | 310/90.5 |
| 4,121,143 | 10/1978 | Habermann et al. | 310/90.5 |
| 4,294,493 | 10/1981 | Sindlinger et al. | 310/90.5 |

*Primary Examiner*—Steven L. Stephan
*Assistant Examiner*—E. To
*Attorney, Agent, or Firm*—Stevens, Davis, Miller & Mosher

[57] ABSTRACT

An axial magnetic bearing includes a rotor overlying a coil in a stator. A second coil is disposed at a location where it does not exert a significant force on the rotor. The second coil generates a magnetic field to oppose and substantially cancel the stray magnetic field generated by the first coil.

9 Claims, 3 Drawing Sheets

CONTROL OF MAGNETIZATION OF A MACHINE WITH AXIAL MAGNETIC BEARINGS

The present invention relates to axial magnetic

Magnetic bearings are used to support relatively moveable components of a machine and can be either a radial bearing which inhibits movement of a shaft in a radial direction or an axial bearing which inhibits movement of a shaft in an axial direction. Axial bearings conventionally comprise a shaft rotatable within a stationary portion of the machine with a rotor secured to and rotatable with the shaft. A stator is disposed to overlie the rotor of the bearing and has a coil wound about the shaft. Current passing through the coil then establishes a magnetic path through the rotor and stator to generate an axial force between the two. The current may be modulated to adjust the axial force and maintain the shaft in a preferred position relative to the housing.

Axial magnetic bearings can either be uni-directional or bi-directional. In a uni-directional bearing, a coil is disposed to one side of the rotor to resist force in one direction only. With a bi-directional bearing, a stator and coil is disposed on each side of the rotor and current can be supplied to either of the coils to oppose relative motion in each direction.

The coil used to generate the magnetic flux also generates stray flux through the shaft and housings. Such flux is undesirable as it has detrimental effects on the seals and the auxiliary bearings of the machine.

In order to reduce the magnetization of the shaft, some designs use a double coil arrangement in which a pair of coils are mounted on each stator with currents of equal magnitude flowing in opposite directions through both the coils. This arrangement produces a minimal shaft magnetization but has the disadvantage that the dissipated power of the windings is twice that of the comparable single coil and also has a lower efficiency ratio of force per magnet volume. In other words, a greater coil volume is required to support a given load with the double coil arrangement.

It is therefore an object of the present invention to provide an axial magnetic bearing in which the above disadvantages are obviated or mitigated.

According to the present invention, there is provided an axial magnetic bearing comprising a housing, a shaft rotatable in said housing and having a rotor secured thereto, a stator secured to said housing and having a winding extending about said shaft to generate a magnetic flux path through said stator and rotor to generate an axial force therebetween, a second coil secured to said housing and located relative to said rotor so as not to impart substantial axial force on said rotor upon a current flowing therethrough and current supply means to supply current to each of said coils and cause it to flow in opposite directions in each of said coils, said current flow in said coils establishing stray magnetic fields of substantially equal magnitude but opposite sense to mitigate the magnitude of the magnetic flux in said housing and shaft.

Preferably the current supply means includes control means to maintain the stray field from the second coil substantially equally in magnitude to the stray field from the first coil as current in the first coil is modulated.

It is also preferred that the second coil is made with a greater number of turns than the first coil so that the current flowing through the coil to produce the opposite magnetizing flux is less and therefore the power dissipated much less than that in the first coil.

Figure 2:
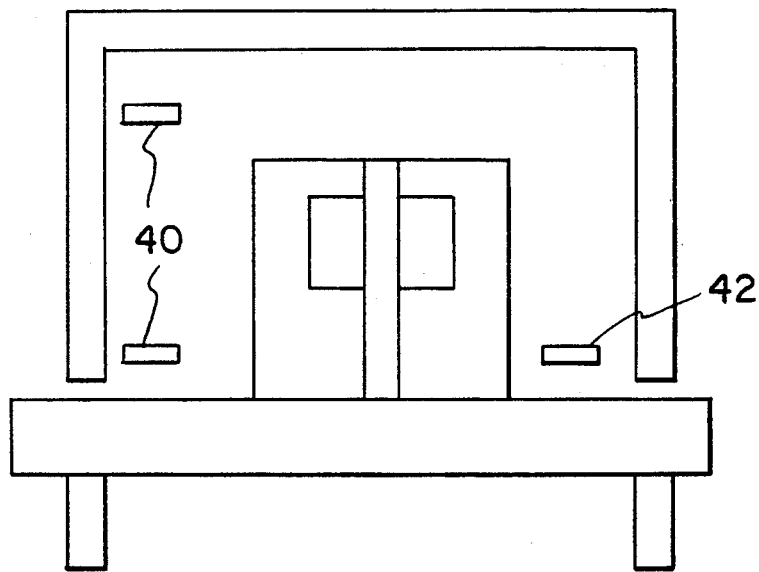
Figure 3:
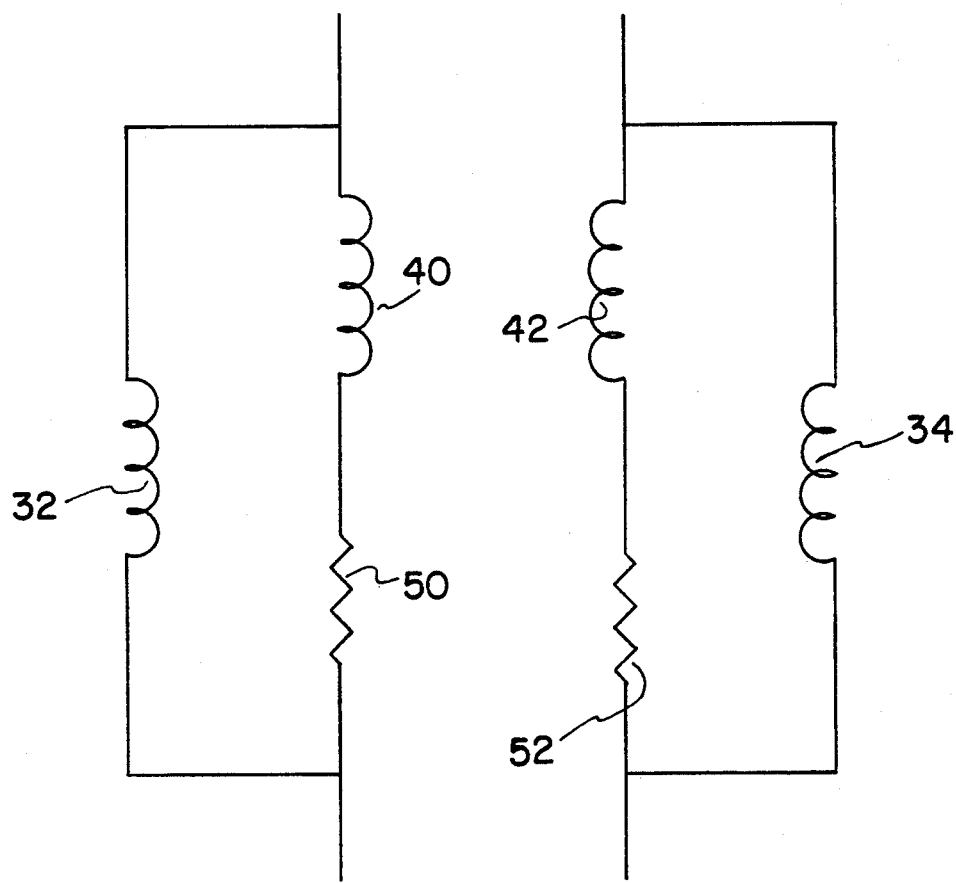

An embodiment of the invention will now be described by way of example only with reference to the accompanying drawings in which FIG. 1 is a schematic representation of a bi-directional magnetic axial bearing;

FIG. 2 is a schematic representation similar to FIG. 1 showing alternate embodiments of the bearing of FIG. 1; and FIG. 3 is a circuit diagram of the electrical arrangement of the coils shown in the bearing of FIG. 1.

Referring therefore to FIG. 1, a magnetic bearing 10 has a housing 12 and a shaft 14 rotatable within the housing. Secured to the shaft 14 is a radially extending rotor 16 having opposed radial faces 18,20.

Stator assemblies 22,24 are located to either side of the rotor 16 and secured to the housing 12. Each of the stators 22,24 has a radial face 26,28 respectively in opposed relation to the radial faces 18,20.

An annular slot 30 is formed in the faces 26,28 respectively and contains a coil 32,34. Current is supplied to the coil through leads 36,38 from a power source (not shown). Mounted about the radially outer periphery of stators 22,24 are second coils 40,42. The coils 40,42 are located so as not to impose a significant axial force upon the rotor 16 when current is supplied to them and are wound with more turns but smaller diameter wire than the coils 32,34. Current is supplied to the coils 40,42 through leads 44,46 respectively. As best seen in FIG. 3, the coils 40,42 are placed in parallel with the coils 32,34 with a balancing resistor 50,52 in series with each of the coils 40,42 to control the current flow in each of the coils. Resistor 52 is chosen so that the ampere turns in each of the coils 34,42 is the same, that is, for steady state conditions the current is split in inverse proportion to the number of turns in the coils. With the coils 34,42 being placed in parallel, an adjustment of the current supplied through the leads 44 or 46 modulates the current flow in each of the coils to maintain them in the desired ratio.

In operation, current is provided to either the coil 32 or coil 34 to generate an axial force in one direction or the other. The magnetic flux loop is established through the rotor and stator as indicated by the chain dot lines and by varying the current, the axial force may be modulated to maintain the rotor at a predetermined position relative to the housing. As also indicated by the chain dot lines, a stray magnetic flux path is also established by the coil 32 through the shaft and housing. To mitigate this flux path, current is supplied to the coil 40 such that a magnetic field is established in the opposite direction but of equal magnitude to the stray flux indicated by the chain dotted line. Thus the net flux flowing through the housing and shaft is substantially zero and magnetization of the shaft is avoided. In practice, current supplied to coil 32 has a steady state component indicative of the average operating conditions which may vary relatively slowly and a transient component indicative of disturbances to the average operating conditions. Because of the circuit configuration of the coils 32,34, coils 40,42 and resistors 50,52, the flux generated by the coils 40,42 will balance stray flux due to the steady component but will not be modulated by the transient component.

It will be appreciated from the circuit shown in FIG. 3 that as the current to the coil 32 or 34 is adjusted, the current to the coil 40 or 42 is likewise adjusted and the stray flux is cancelled.

It will be seen, therefore, that the advantages of the single coil are retained in terms of specific load capacity but the unwanted effects of the stray magnetic flux are mitigated.

In the embodiment of FIG. 1, the coil 40,42 has been illustrated as disposed on the periphery of the stators. However, the coils 40,42 may be located within the housing at a location other than the periphery of the coil as illustrated in FIG. 2. In FIG. 2, alternative locations of the second coils are indicated in ghosted outline, each of which, it will be noted, is located so as not to exert a substantial axial force upon the rotor while in a position to generate a magnetic flux circuit of similar path and opposite direction to the magnetic circuit of the stray field generated by the coils within the stator.

We claim:

1. A axial magnetic bearing comprising a housing, shaft rotatable in said housing and having a rotor secured thereto, a stator secured to said housing and overlying said rotor in a radial direction, a first coil means including at least on coil secured to said stator and having a winding extending about said shaft to generate a magnetic flux path through said stator and rotor to generate an axial force therebetween, a second coil means secured externally to said stator within said housing and current supply means to supply current to each of said coil means and cause it to flow in opposite directions in each of said coil means, the current flow in said first and second coil means establishing stray magnetic fields of substantially equal magnitude but opposite sense to mitigate the magnitude of the magnetic flux in said housing and shaft.

2. A bearing according to claim 1 wherein said current supply means includes control means to maintain said stray magnetic field from said second coil means substantially equal in magnitude to said stray magnetic field from said first coil means as current in said first coil means is modulated.

3. A bearing according to claim 1 wherein said first and second coil means have a different number of turns and said current supply means supplies current to said first and second coil means in inverse proportion to the ratio of the turns in each coil means to maintain the ampere turns substantially equal.

4. A bearing according to claim 3 wherein said current supply means includes control means to maintain said current supply to said first and second coil means in the desired ratio as current to said first coil means is modulated.

5. A bearing according to claim 4 wherein said current control means is a current splitting circuit.

6. A bearing according to claim 3 wherein said second coil means has more turns than said first coil means.

7. A bearing according to claim 1 wherein said second coil means extends about said shaft at a radius greater than the radius of said rotor.

8. A bearing according to claim 7 wherein said stator is annular and said second coil means is located on the periphery of said stator.

9. A bearing according to claim 1 wherein said second coil means is axially displaced from said rotor along said shaft.

* * * * *